United States Patent
Serrat et al.

(10) Patent No.: US 11,085,156 B2
(45) Date of Patent: *Aug. 10, 2021

(54) WEEDING SYSTEMS AND METHODS, RAILWAY WEEDING VEHICLES

(71) Applicant: Bilberry SAS, Gentilly (FR)

(72) Inventors: Hugo Serrat, Saint-Cloud (FR); Jules Beguerie, Massy (FR); Guillaume Jourdain, Antony (FR)

(73) Assignee: Bilberry SAS, Gentilly (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/482,848

(22) PCT Filed: Feb. 6, 2018

(86) PCT No.: PCT/EP2018/052979
§ 371 (c)(1),
(2) Date: Aug. 1, 2019

(87) PCT Pub. No.: WO2018/141995
PCT Pub. Date: Aug. 9, 2018

(65) Prior Publication Data
US 2020/0011019 A1    Jan. 9, 2020

(30) Foreign Application Priority Data

Feb. 6, 2017    (EP) .................................. 17305130

(51) Int. Cl.
*E01H 11/00*    (2006.01)
*B05B 12/12*    (2006.01)
(Continued)

(52) U.S. Cl.
CPC ............ *E01H 11/00* (2013.01); *B05B 12/122* (2013.01); *B05B 13/005* (2013.01);
(Continued)

(58) Field of Classification Search
CPC ..... E01H 11/00; B05B 12/122; B05B 13/005; G06K 9/00791; G06T 1/20; G06T 2207/20021; G06T 7/0002; H04N 5/2253
See application file for complete search history.

(56) References Cited

U.S. PATENT DOCUMENTS 5,246,164 A * 9/1993 McCann .............. A01B 79/005
239/11
5,278,423 A * 1/1994 Wangler .............. A01M 7/0089
250/559.4
(Continued)

FOREIGN PATENT DOCUMENTS

EP    1 521 885 B1    4/2005
EP    2 728 068 A1    5/2014
(Continued)

OTHER PUBLICATIONS

International Search Report related to Application No. PCT/EP2018/052979; dated Apr. 19, 2018.
(Continued)

*Primary Examiner* — John B Strege
(74) *Attorney, Agent, or Firm* — von Briesen & Roper, s.c.

(57) ABSTRACT

A weeding system for a railway weeding vehicle comprising a camera and a spraying unit with several supply modules, a nozzle and a controller module to receive a weed species detection signal and to command the spraying of chemical agent. The weeding system also comprises a weed species identification unit with a communication module, a memory module and a processing module having several parallel processing cores. Each parallel processing core performs a convolution operation between a sub-matrix constructed from nearby pixels of the image and a predefined kernel stored in the memory module to obtain a feature representation sub-matrix of the pixel values of the image. The
(Continued)

processing module computes a probability of presence of a weed species from the feature representation matrix and generates a weed species detection signal.

15 Claims, 3 Drawing Sheets

(51) Int. Cl.
    *B05B 13/00*     (2006.01)
    *G06K 9/00*     (2006.01)
    *G06K 9/62*     (2006.01)
    *G06T 1/20*     (2006.01)
    *G06K 9/78*     (2006.01)
    *H04N 5/225*     (2006.01)

(52) U.S. Cl.
    CPC ..... *G06K 9/00657* (2013.01); *G06K 9/00791* (2013.01); *G06K 9/6245* (2013.01); *G06K 9/78* (2013.01); *G06T 1/20* (2013.01); *H04N 5/2253* (2013.01)

(56) References Cited

U.S. PATENT DOCUMENTS

| | | | | |
|---|---|---|---|---|
| 6,389,785 | B1* | 5/2002 | Diekhans | A01B 69/001 172/4.5 |
| 7,263,210 | B2* | 8/2007 | Kummel | A01M 7/0089 382/110 |
| 7,463,751 | B2* | 12/2008 | Farina | G01N 21/47 239/692 |
| 8,437,498 | B2* | 5/2013 | Malsam | A01G 25/16 239/71 |
| 2009/0226036 | A1* | 9/2009 | Gaal | A01M 7/0089 382/103 |
| 2015/0245565 | A1* | 9/2015 | Pilgrim | A01G 7/06 280/79.2 |
| 2017/0039425 | A1* | 2/2017 | Itzhaky | G06K 9/00657 |
| 2017/0223947 | A1* | 8/2017 | Gall | A01M 7/0089 |
| 2019/0147249 | A1* | 5/2019 | Kiepe | G06K 9/00671 382/110 |

FOREIGN PATENT DOCUMENTS

WO     WO 2015/181642 A3     12/2015
WO     WO-2015181642 A2 *     12/2015     ............... G06T 1/20

OTHER PUBLICATIONS

Carsten Steger Ed, et al:"Extracting Curvilinear Structures: A Different Geometric Approach", Apr. 15, 1996 Computer Vision ECCV '96, Springer Berlin Heidelberg, Berlin, Heidelberg, pp. 630-641.

* cited by examiner

WEEDING SYSTEMS AND METHODS, RAILWAY WEEDING VEHICLES

CROSS-REFERENCE TO RELATED APPLICATION

This Application is a 35 USC § 371 US National Stage filing of International Application No. PCT/EP2018/052979 filed on Feb. 6, 2018 and claims priority under the Paris Convention to European Patent Application No. 17305130.1 filed on Feb. 6, 2017.

FIELD OF THE DISCLOSURE

The instant invention relates to weeding systems for railway weeding vehicles, to railway weeding vehicles, methods for weeding a train track using such railway weeding vehicles and method for calibrating such weeding systems.

BACKGROUND OF THE DISCLOSURE

In particular, the instant invention is related to railway weeding vehicles. Railway weeding vehicles can take the form of weed sprayer trains or road-rail vehicles on which are mounted custom spraying systems with sprayers and chemical tanks filed with herbicides adapted to eliminate weeds along railway tracks.

To reduce environmental impact as well as the cost of the weeding operation, the railway weeding vehicle can be provided with an optical sensor sensitive to the green color of the vegetation. The spraying system can then be commanded to only open the nozzle when a predefined threshold of green color is detected on the ground. Document DE-4132637 describes such an improved railway weeding vehicle.

One disadvantage of such a system is that it is not sensitive to the species of the weed and thus different weed species cannot be treated with different herbicides.

Documents WO-99/17606, EP-1521885-B1 and EP-1875005-B1 describe improvements of such systems in which the identification of weed species takes place via spectrum analysis of the emission light of the weed together with shape recognition algorithms that compares the shape of the observed weed with shapes stored in a weed database.

Such systems present several disadvantages that prevent their uses in practice.

First, while the spectrum of emission light of the weed can be characterized in laboratory condition, the spectral reflectance of plants varies strongly in natural condition depending on weed species and soil variations. Naturally occurring weeds present a great diversity of species which can differ greatly from industrially grown weed. Soil composition also has a strong effect on the color of the weeds and its spectral reflectance. As a result, the spectrum of emission light of the weed can usually not be used as a reliable criterion to distinguish between weed species.

Second, given the great diversity of weed species, weed shapes database have to be very large to store all different shapes variations (shapes of young weeds, of old weeds, of every sub-species . . . ). Shape recognition algorithms that compare the shape of the observed weed with shapes stored in weed shapes database are thus very slow as they have to scan through these large databases.

Third, the spectrum analysis of the emission light of the weed requires a brightness level that makes the use of such systems difficult when the brightness is low, especially at night when the daily usual traffic can be stopped to allow railway weeding. The low level of brightness and the speed of the railway vehicle induce noise problem of the green detection, which has a negative impact on the sharpness of the acquired images and the processes that can be applied based on the acquired images.

As a consequence, railway weeding vehicles can only travel at a very low speed to give enough time for the weed identification algorithm to process the images acquired by the camera and identify the weed species.

There is thus a need for a weeding system that would be able to identify weed species at a higher speed and with a greater accuracy.

The instant invention has notably for object to improve this situation.

SUMMARY OF THE DISCLOSURE

To this aim, according to the invention, such a weeding system for a railway weeding vehicle, comprises:
- at least one camera adapted to be mounted on a railway vehicle to acquire an image of a portion of a railway track while said railway vehicle is travelling on a train track, said image comprising a matrix of pixel values,
- a spraying unit adapted to be mounted on said railway vehicle and comprising
- at least two supply modules, each supply modules comprising a chemical agent tank and an electronic delivery valve,
- at least one nozzle to spray a chemical agent from at least one of said supply modules, and
- a controller module able to receive a weed species detection signal and to selectively command the spraying of chemical agent from at least one of said supply modules through said at least one nozzle on the basis of said weed species detection signal.

The weeding system is characterized in that it further comprises:
- a weed species identification unit comprising
- a communication module able to receive the image acquired by the camera and to send a weed species detection signal to a controller module of a spraying unit of the weeding system,
- a memory module able to store said image, and
- a processing module comprising plurality of parallel processing cores,
- each parallel processing core being able to perform at least one convolution operation between a sub-matrix constructed from nearby pixels of the image and a predefined kernel stored in the memory of the processing unit to obtain a feature representation sub-matrix of the pixel values of the image,
- the processing module being able to compute at least one probability of presence of a weed species among a database of weed species from a feature representation matrix of the image constructed from the feature representation sub-matrices constructed by the parallel processing cores, and to generate a weed species detection signal on the basis of said at least one probability of presence.

Therefore, several features are taken into account at once in the recognition of weed species such as for example the shape, the texture, the color and/or the location of the weed species in the images, thanks to the aforesaid "artificial intelligence" implementation using several operations including at least one convolution operation involving the kernel.

Conversely, a simple detection based only on color would present drawbacks. Indeed, the difference in brightness between day and night makes hardly feasible to distinguish weed species only with color detection, hence the need to use other features.

With these features, the identification of weed species can be performed at high speed and with a good accuracy. The parallel processing and convolution operations allow a distributed and accurate identification of the weed species.

To this aim, a first object of the invention is a weeding system for a railway weeding vehicle, comprising:

at least one camera adapted to be mounted on a railway vehicle to acquire an image of a portion of a railway track while said railway vehicle is travelling on a train track, said image comprising, a matrix of pixel values, a spraying unit adapted to be mounted on said railway vehicle and comprising  at least two supply modules, each supply module comprising a chemical agent tank and an electronic delivery valve,  at least one nozzle to spray a chemical agent from at least one of said supply modules, and  a controller module able to receive a weed species detection signal and to selectively command the spraying of chemical agent from at least one of said supply modules though said at least one nozzle on the basis of said weed species detection signal.

The weeding system further comprises a weed species identification unit comprising a communication module able to receive the image acquired by the camera and to send a weed species detection signal to a controller module of a spraying unit of the weeding system, a memory module able to store said image, and a processing module comprising a plurality of parallel processing cores, each parallel processing core being able to perform at least one convolution operation between a submatrix constructed from nearby pixels of the image and a predefined kernel stored in the memory module to obtain a feature representation submatrix of the pixel values of the image, the processing module being able to compute at least one probability of presence of a weed species among a database of weed species from a feature representation matrix of the image constructed from the feature representation submatrices constructed by the parallel processing cores, and to generate a weed species detection signal on the basis of said at least one probability of presence.

In some embodiments, one might also use one or more of the following features:

the spraying unit and the camera are separated from one another on the railway vehicle by a separation distance $d_s$ along a longitudinal axis of the railway vehicle, the weed species identification unit is able to generate a weed species detection signal from an image acquired by the camera with a latency time $t_l$, said separation distance $d_s$ and said latency time $t_l$ are such that $d_s/(t_l+t_p)>v$, where v is a speed of the railway weeding vehicle travelling on a train track and $t_p$ is a processing time of the spraying unit, wherein, said speed v is higher than 10 km/h and said separation distance ds is less than 10 m;

the camera has a longitudinal extension of the field of view $FOV_X$ along a longitudinal axis of the railway vehicle, the weed species identification unit is able to generate a weed species detection signal from an image acquired by the camera with a latency time $t_l$, said longitudinal extension of the field of view ds and said latency time $t_l$ are such that $FOV_X/t_l>v$, where v is a speed of the railway weeding vehicle travelling on a train track, said speed v is higher than 40 km/h and said longitudinal extension of the field of view $FOV_X$ is less than 5 m;

the camera is mounted on the railway vehicle in order to acquire an image comprising a matrix of at least one million pixel values each pixel of said at least one million pixel values independently covers an elementary area of the ground area of less than five square millimetres;

each parallel processing core perform said at least one convolution operation by computing a matrix to matrix multiplication between the submatrix and a predefined kernel matrix, or by computing a Fast Fourier Transform of the submatrix;

the parallel processing cores of the processing module are able to perform pooling operation of the feature representation matrix of the image comprising determining a statistic of a submatrix of nearby values of said feature representation matrix, in particular a maximum of said submatrix of nearby values;

the parallel processing cores of the processing module are able to perform a nonlinear parallel processing of the feature representation matrix of the image by applying a nonlinear operation to each value of said feature representation matrix, such as a rectified linear activation function;

the processing module performs a sequence of n processing operations starting from an input matrix generated from the pixel values of the image and ending with an output matrix comprising at least one probability of presence of a weed species among a database of weed species, in particular each processing operation i of said sequence of successive processing operations takes as input a feature representation matrix $F_{i-1}$ outputted by a preceding processing operation i-1 or an input matrix generated from the pixel values of the image, and generates a feature representation matrix $F_i$;

the output matrix further comprises at least one value indicative of a location of a weed species among the database of weed species inside the image acquired by the camera and the weed species detection signal comprises a weed species location indicator;

the spraying unit comprise a plurality of nozzles arranged along a transversal direction of the railway vehicle, and the controller module of the spraying unit receives the weed species detection signal and further command the spraying of chemical agent through the plurality of nozzles based on the weed species location indicator;

the spraying unit comprise at least one movable nozzle able to selectively spray a plurality of target zones along a transversal direction of the railway vehicle, and the controller module of the spraying unit receives the weed species detection signal and further command a position and/or orientation of the movable nozzle based on the weed species location indicator.

Another object of the invention is a railway weeding vehicle comprising a weeding system as detailed above mounted on said vehicle.

Yet another object of the invention is a method for weeding a train track using a railway weeding vehicle as detailed above, comprising acquiring an image of a portion of a railway track while said railway vehicle is travelling on a train track process for a railway weeding vehicle, using at least one camera mounted on the railway vehicle, said image comprising a matrix of pixel values, receiving the image acquired by the camera in a communication module of a weed species identification unit of the railway vehicle and storing said image in a memory module of said weed species identification unit, performing in parallel, in a plurality of respective parallel processing cores of a processing module, a plurality of respective convolution operations, each convolution operation being performed between a submatrix constructed from nearby pixels of the image and a predefined kernel stored in the memory of the processing unit to obtain a feature representation submatrix of the pixel values of the image computing at least one probability of presence of a weed species among a database of weed species from a feature representation matrix of the image constructed from the feature representation submatrices constructed by the parallel processing cores, generating a weed species detection signal on the basis of said at least one probability of presence a weed species and sending said weed species detection signal to a controller module of a spraying unit of the weeding system, receiving the weed species detection signal in a controller module of a spraying unit mounted on the railway vehicle, and selectively commanding the spraying of chemical agent from at least one supply modules spraying unit though at least one nozzle on the basis of the weed species detection signal.

Another object of the invention is a method for calibrating a weeding system as detailed above, adapted to spray a plurality of weed species listed in a database of weed species, wherein a railway vehicle is provided with at least one camera able to acquire an image of a portion of a railway track, during a movement of said railway vehicle on a railway, said image comprising a matrix of pixel values, said railway vehicle travels a train track presenting at least a predefined number of each weed species of a database of target weed species, and acquires at least a predefined number of images of each weed species of said database of target weed species, a training dataset is constructed from said predefined number of images of each weed species by tagging said weed species on said images, a set of weed identification model weights is determined from the training dataset, said set comprising at least one predefined kernel for a convolution operation performed by a parallel processing core of a weeding system as detailed above, the set of weed identification model weights is stored in a memory module of a weeding system as detailed above.

BRIEF DESCRIPTION OF THE DRAWINGS

Other characteristics and advantages of the invention will readily appear from the following description of several of its embodiments, provided as non-limitative examples, and of the accompanying drawings.

On the drawings.

On the different figures, the same reference signs designate like or similar elements.

DETAILED DESCRIPTION OF THE DISCLOSURE

Figure 1:
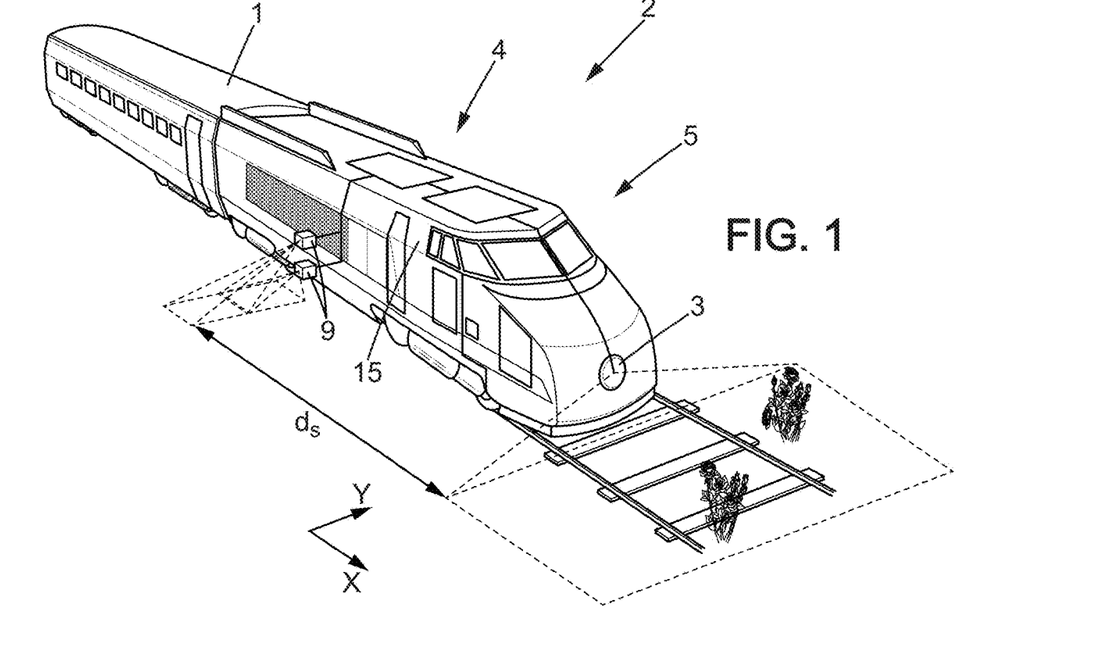
FIG. 1 is a schematic perspective view of a railway weeding vehicle comprising a weeding system according to an embodiment of the invention.

FIG. 1 illustrates an example of railway weeding vehicle 1 according to the invention.

The railway weeding vehicle 1 is designed to travel on rails tracks. In particular, the railway weeding vehicle 1 can be a train or a road-rail vehicle that can operate both on rail tracks and a conventional road. The railway weeding vehicle 1 may comprise a single wagon or be made of several rail cars and/or locomotives.

The railway weeding vehicle 1 extends, and is designed to travel, along a longitudinal direction X on a rail track usually comprising two rails juxtaposed in a transversal direction Y perpendicular to the longitudinal direction X.

Figure 2:
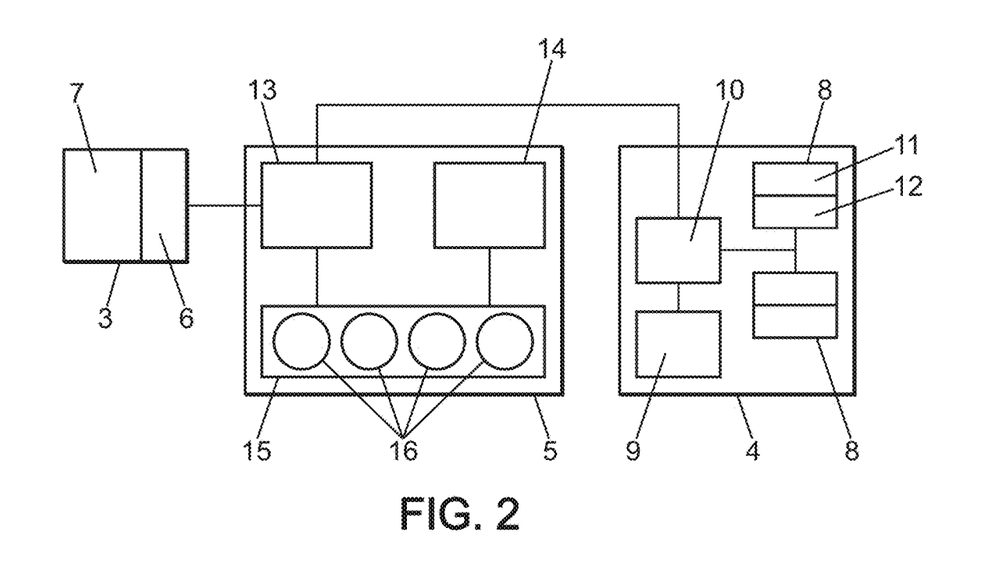
FIG. 2 is an organigram illustrating the modules and units of the weeding system of FIG. 1, FIGS. 3 and 4 are two flowcharts detailing the processing operations performed by the processing module of a weed species identification unit of the weeding system of FIGS. 1 and 2.

The railway weeding vehicle 1 is provided with a weeding system 2 according to the invention, which is illustrated schematically on FIG. 2.

More precisely, the weeding system 2 comprises one or several camera(s) 3, a spraying unit 4 and a weed species identification unit 5.

Cameras 3 are mounted on the railway vehicle 1 in order to be able to acquire images of a portion of a railway track while the railway vehicle 1 is travelling on a train track. Some cameras 3 can for instance be mounted at the front or under the vehicle to acquire images of the ballast and the ties separating the rail tracks. Additional cameras 3 can be mounted on each sides of the vehicle in order to acquire images of the sides of the ballast. In a variant, a single camera 3 can be used and mounted on the vehicle in order to acquire an image of the entire region of interest of the rail track. The cameras 3 can be mounted on shock absorbers in order to reduce the vibrations during movements of the vehicle 1 and to increase the sharpness of the acquired images. As it will be explained hereafter, several features are taken into account in the recognition of weed species like the shape, the texture, the color and/or the location of the weed species in the images. The sharpness of the acquired images is also important to obtain such information. Indeed, advantageously, the acquisition of the images is carried out at night when the traffic is lower, and the railway vehicle 1 is traveling at a high speed. Several criteria are therefore necessary to recognize a wide variety of weed species.

Each camera 3 comprises a sensor 6, such as a CCD or CMOS sensor, and an optical system 7 comprising a plurality of lenses and/or mirrors.

A camera 3 acquires an image comprising a matrix of pixel values. Each image comprise W*H pixels where W is the number of pixels along a width of the image and H is a number of pixels along a height of the image. The width W and the height H of the camera define a resolution of the sensor of the camera. The sensor can in particular acquire image comprising matrix of at least one million pixel values, more preferably over 5 million pixel values.

Alternatively, a linear camera can be used and a matrix of pixel values can be reconstructed from the output of the linear camera.

Advantageously, the location of the camera, the resolution of the sensor and the design of the optical system are selected so that the image acquired by the camera comprises a matrix of at least one million pixel values wherein each pixel of said matrix independently covers an area of the ground of less than five square millimetres, preferably less than two square millimetres. Such a spatial resolution of the camera is important to be able to reliably identify the weed species as detailed further below.

The camera 3 can be a color camera. In this case, the pixel values each comprises for instance three channel such as RGB (red-green-blue) values and the matrix of pixel values is a 3D matrix of dimensions W*H*3 for instance.

In contrast to the previously known weeding systems, the camera 3 may be free of color filters and polarizer. In particular, the optical system 7 of the camera 3 may be constituted only by lenses and/or mirrors. Since only the general color and no absolute spectral information is needed to identify the weed, a bare camera can be used and only provided with selected lenses and mirrors to obtain the spatial resolution necessary for weed species identification.

A spraying unit 4 is also mounted on the railway vehicle 1 and comprises several components that will now be described in greater details.

As illustrated on FIG. 2, the spraying unit 4 comprises at least two supply modules 8 at least one nozzle 9 and a controller module 10.

Each supply module 8 comprises a chemical agent tank 11 and an electronic delivery valve 12.

The chemical agent tank 11 contains a liquid that can be an herbicide or water.

The tank can contain a premix of water and herbicide or a separate tank of water can contain water to be mixed with an herbicide on the fly, during or just prior to the delivery. Each supply module 8 can be provided with a tank 11 containing different liquid. For instance, one supply module 8 can be provided with a tank 11 containing an herbicide containing an active agent adapted for weeding treatment before sprouting of weeds, while another supply module 8 can be provided with a tank 11 containing an herbicide with an active agents adapted for weeding treatment after the sprouting of weeds.

The spraying unit 4 comprises at least one nozzle 9 to spray a chemical agent from at least one of said supply modules 8.

The controller module 10 of the spraying unit 4 receives a weed species detection signal from the weed species identification unit 5 as it will be described further below. On the basis of this signal, the controller module 10 selectively commands the spraying of chemical agent from at least one of the supply modules 8 through the nozzle 9.

The controller module 10 may command the spraying of chemical agent with a spraying delay after the reception of the weed species detection signal.

The spraying delay may be computed on the basis of a latency time of the weed recognition unit as well as a speed of the vehicle 1 and a calibrated distance between the nozzle 9 and the camera 3.

The spraying delay may also take into account a pre-calibrated time of delivery of the chemical agent corresponding to the latency of the mechanical systems of the spraying unit and the time of displacement of the liquid in the tubes of the spraying unit for instance.

In one embodiment of the invention, the weed species detection signal only comprises information regarding the weed species. The controller module 10 of the spraying unit 4 will then select a supply module 8 containing an adapted herbicide for this weed species and command the electronic delivery valve 12, and if needed the nozzle 9, to spray the chemical agent.

In other embodiments of the invention, the weed species detection signal may comprise a weed species location indicator.

In one of these embodiments, the spraying unit 4 comprise a plurality of nozzles 9 arranged along the transversal direction Y of the railway vehicle. The nozzles 9 may be located under the vehicle 1 and/or on the side of train.

In this embodiment, the controller module 10 of the spraying unit 4 may then receive the weed species detection signal and command the spraying of chemical agent through the plurality of nozzles 9 based on the weed species location indicator. In particular, only a restricted number of nozzles 9 may be open in accordance with the location of the weed on the ground.

In a variant, the spraying unit 4 may comprise at least one movable nozzle 9. The movable nozzle may be able to selectively spray a plurality of target zones on the ground, for instance a plurality of target zone juxtaposed along the transversal direction Y of the railway vehicle 1. The movable nozzle 9 may have its position and/or orientation controlled by a tilting or sliding control unit.

In this embodiment, the controller module 10 of the spraying unit 4 receives the weed species detection signal and commands the position and/or the orientation of the movable nozzle 9 based on the weed species location indicator. In particular, the position and/or orientation of the nozzle 9 may be adapted in accordance with the location of the weed on the ground in order to spray herbicide on the correct location on the ground.

The two embodiments described above can be combined in order to provide a plurality of movable nozzle independently moved and selected.

We now refer more specifically to FIG. 2 which illustrates in greater detail a weed species identification unit 5 according to an embodiment of the invention.

The weed species identification unit 5 comprises a communication module 13, a memory module 14 and a processing module 15.

The communication module 13 receives the image acquired by the camera 3 and sends the weed species detection signals to the controller module 10 of the spraying unit 4 of the weeding system 1 as it was already described before.

In particular, the camera 3 may generate a continuous stream of images during the movement of the vehicle 1 on the rail track, in which case the communication module 13 may continuously receive said images and all the modules of the weed species identification unit 5 may be operating in real-time or soft-real-time thus also generating and sending a continuous stream of weed species detection signals to the controller module 10 of the spraying unit 4.

The communication module 13 may communicate with the camera 3 and the controller module 10 of the spraying unit 4 by wired communication or using a wireless protocol (e.g. optical or radio protocol such as infra-red or "Wi-Fi").

The memory module 14 is able to store the received image or stream of images. The memory module 15 may comprise several sub-modules and may be distributed in several chips of the weed species identification unit 5. In particular, the memory module 14 may comprise a non-volatile storage memory and a volatile storage memory.

The processing module 15 comprises a plurality of p parallel processing cores 16. The number p of parallel processing cores 16 is greater than one. The processing module may for instance comprise at least four parallel processing cores 16. The parallel processing cores 16 are able to run parallel compute kernels as it will be described in greater details further below.

Each parallel processing core 16 may comprise a plurality of sub-core processors in order to further parallelize the processing of the image.

In particular, the parallel processing cores may be part of a single computing component 15, for instance a central processing unit (CPU) or a graphical processing unit (CPU).

The parallel processing core 16 may have access to specific area of the memory module 14, in particular, the memory module 14 may include a memory chip located close to the processing module 15, for instance a memory chip of a graphical processing unit incorporating the processing module 15.

Each parallel processing core 16 performs at least one convolution operation between a sub-matrix constructed from nearby pixels of the image and a predefined kernel K stored in the memory module 15 to obtain a feature representation sub-matrix F of the pixel values of the image. For instance, each sub-matrix of nearby pixels of the image chosen has the same dimensions as the predefined stored kernel K.

The kernel K is a small matrix that can be considered as an equivalent receptive field for a given pixel in the image.

The convolution operation involves computing the dot product between the entries of the kernel K and a sub-matrix P constructed from nearby pixels of the image to produce a feature representation sub-matrix which is a filtered representation of the image.

As previously explained, a sub-matrix P of the image corresponds to nearby pixels of this image. Each image can therefore be divided into several sub-matrices P so that the dot product computed between the kernel K and each sub-matrix P can typically generate several feature representation sub-matrices. It is then possible to construct a feature representation matrix from these feature representation sub-matrices.

Given the locality of the convolution operation it can be easily parallelized which strongly accelerate the processing of the image.

Moreover, as detailed further below, the coefficients of the kernel can be calibrated so that the kernel is general and can be applied to a wide variety of weed species. The determination of the coefficients of the kernel is part of the determination of the weed identification model weights. It means that the convolution operation performed with the kernel K should allow to recognize each weed species. The coefficients of the kernel are therefore representative of features characterizing each weed species.

To distinguish different weed species, several features may be taken into account alone or in combination like the shape, the texture, the color and/or the location of the weed species in the images. The coefficients or weights of the kernel must thus be calibrated according to these parameters or features. By taking into account a sufficient number of features distinguishing the different weed species, the effectiveness of the recognition of weed species and the speed of said recognition are improved. This is particularly advantageous to allow the railway vehicle 1 to travel faster on a train track.

In particular, to perform said convolution operation, each parallel processing core may compute a matrix to matrix multiplication between the sub-matrix P and a predefined kernel matrix K associated to the kernel.

The coefficients of the kernel K can be identical across the image and thus identical between the parallel processing cores or can vary depending on the location on the image.

This matrix to matrix multiplication can be parallelized by using conventional parallel processing algebra algorithms to increase the speed of processing of the image.

Alternatively, the convolution operation may be performed by computing a Fast Fourier Transform of the sub-matrix P of the image.

Figure 3:
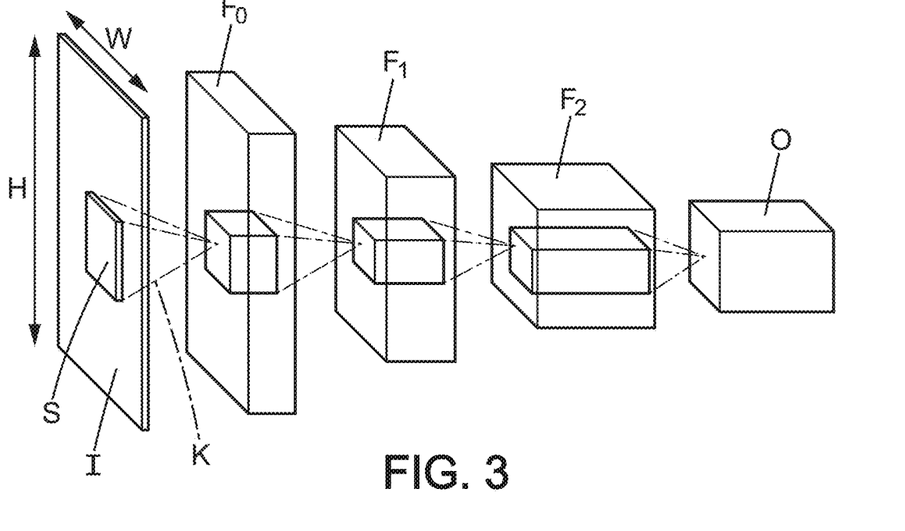
Figure 4:
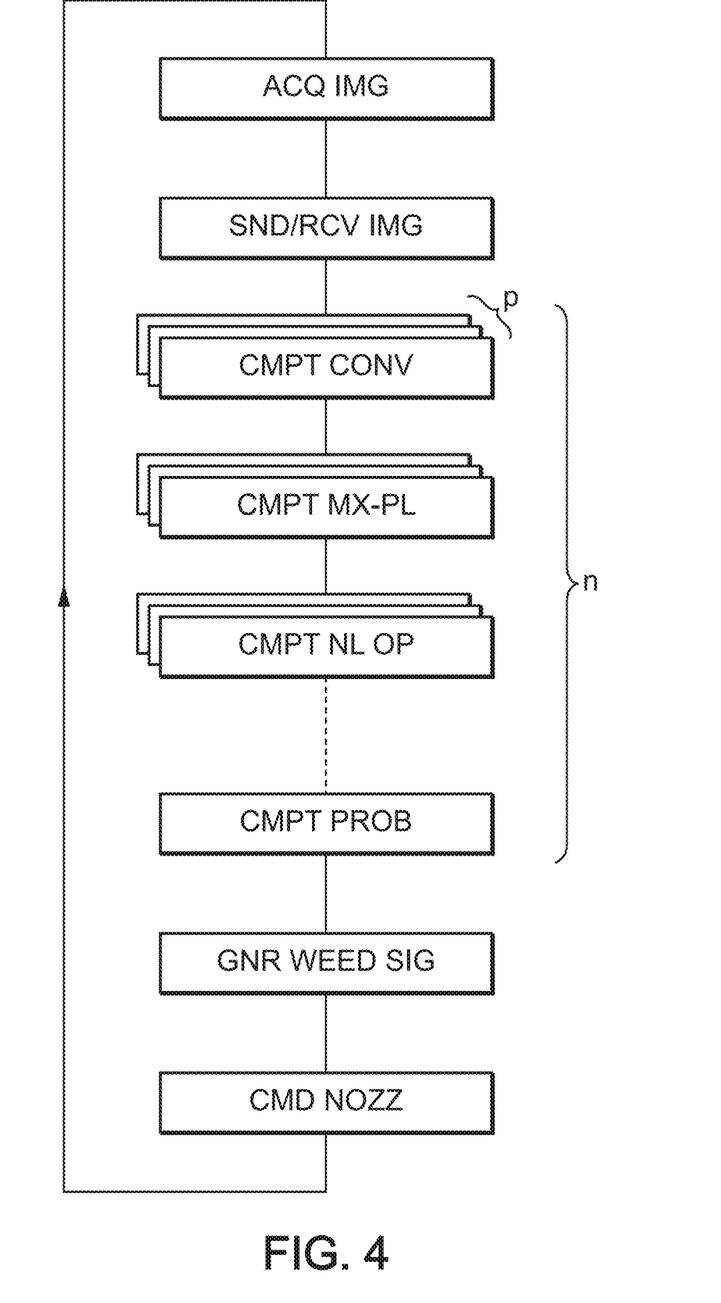

As illustrated on FIGS. 3 and 4, the processing module usually performs a sequence of n processing operations starting from an input matrix I generated from the pixel values of the image and ending with an output matrix O comprising at least one probability of presence of a weed species among a database of weed species.

Advantageously, each processing operation i of said sequence of successive processing operations takes as input a feature representation matrix $F_{i-1}$ outputted by a preceding processing operation i-1 or the input matrix I generated from the pixel values of the image, and generates a feature representation matrix $F_i$.

The processing operations involve at least one of:
a convolution operation as described before,
a pooling operation, and/or
a non-linear parallel processing.

The pooling operation and the non-linear parallel processing will now be described in further details.

A pooling operation can be performed by each parallel processing core of the processing module.

A pooling operation involve can be performed on sub-matrix S of nearby values determined from the input matrix I or from a feature representation matrix $F_{i-1}$ outputted by a preceding processing operation i-1.

A feature representation matrix $F_i$ can be constructed from the feature representation sub-matrices obtained by applying a convolution operation between the kernel K and sub-matrices P of the input matrix I or of the feature representation matrix $F_{i-1}$. Likewise, the feature representation matrix $F_i$ can be divided into several sub-matrices S of nearby values. Similarly, the input matrix I can be divided into several sub-matrices S of nearby values.

A pooling operation can be applied on each sub-matrix S of nearby values. It is for instance possible to take the feature representation sub-matrices as sub-matrices S of nearby values when the pooling operation is applied to a feature representation matrix.

The pooling operation is a local operation of reducing the size of a feature representation matrix $F_{i-1}$ or of the input matrix I by preserving the most important information. For instance, for each sub-matrix S of nearby values, only one value is retained. In other words, after applying the pooling operation, a feature representation matrix $F_i$ with a reduced size is obtained so that the said feature representation matrix $F_i$ only contains, for instance, one value for each sub-matrix S of the feature representation matrix $F_{i-1}$ or of the input matrix I.

The pooling operation involves determining a statistic of said sub-matrix S of nearby values. The statistic is for instance a maximum of said sub-matrix S, as in so-called max-pooling. In the embodiment in which a max-pooling operation is used, only the maximum value of each sub-matrix S is retained.

Since the pooling operation is a local operation, the latter can also be easily parallelized and increase the robustness of the weed species identification with regards to small translation of the plant in the image between the training images and the test images.

The parallel processing cores of the processing module are also able to perform a non-linear parallel processing of the input matrix I or of a feature representation matrix $F_{i-1}$ outputted a preceding processing operation i-1.

By "non-linear operation", it is meant that the output y=f(x) of the non-linear function f applied to a scalar, vector or tensor x is not linear with respect to said scalar, vector or tensor x.

One example of non-linear function is a rectified linear unit such as the function f(x)=max(0, x) or a generalized rectified linear unit such as a leaky rectified linear unit, a parametric rectified linear unit or a maxout unit. For instance, the generalized function may be:

$$f(x)=\max(0,x)+a*\min(0,x)$$

where a is a predefined parameter.

The non-linear function can be independently applied to each value of the input matrix I or the feature representation matrix $F_{i-1}$.

Unlike the pooling operation, the non-linear operation can preserve the size of the input matrix I or of the feature representation matrix $F_{i-1}$.

On the other hand, in one embodiment, one or more operations may be weighted. The weighting of the different operations may for example be determined during a learning step described below.

Here again, the independent application of the non-linear function to each value of the input matrix I or the feature representation matrix $F_{i-1}$ makes the processing easily parallelized and thus reduces the latency of the weed identification unit.

The successive processing operation may thus lead to an output matrix containing probabilities of detecting each weed species in the database of weed species.

In some embodiments of the invention, the output matrix may further comprise at least one value indicative of a location of a weed species inside the image acquired by the camera.

This allows to select and/or move the nozzle to reduce the chemical consumption.

Advantageously, every identified weed species may be provided with a location information.

Such a value indicative of a location of a weed species may for instance be a bounding box indicative of a location of the weed species inside the image acquired by the camera.

From the output matrix, the processing module 15 is thus able to compute at least one probability of presence of a weed species among the database of weed species.

The processing module 15 may thus generate a weed species detection signal on the basis of said probability of presence.

Using the special operation and parallel processing described above, it is thus possible to obtain a weed identification system with a very low latency.

More precisely, the weed species identification unit 5 may be able to generate a weed species detection signal from an image I acquired by the camera 3 with a latency time $t_l$.

The latency time $t_l$ corresponds to a time separating the generation of the weed species detection signal from the reception of the corresponding image I.

The latency time $t_l$ may be less than 500 ms, in particular less than 200 ms or even less than 100 ms with a corresponding accuracy of detection over 75%, in particular over 90%.

By accuracy of detection, it is meant the number of detection among the weed species observed in a large number of images, for instance more than 1000 images (i.e. number of true positive over total number of weed specimens appearing on said images).

Moreover, the spraying unit 4, in particular the nozzle 9 of the spraying unit, and the camera 3 may be separated from one another on the railway vehicle 1 by a separation distance $d_s$ along the longitudinal axis X of the railway vehicle.

The separation distance $d_s$ and the latency time $t_l$ may be such that $d_s/(t_l+t_p)>v$, where v is a speed of the railway weeding vehicle 1 travelling on a train track and $t_p$ is a processing time of the spraying unit.

The processing time of the spraying unit $t_p$ is the time between the reception in the spraying unit of the information that a weed has been identified and the actual spraying of the herbicide. This time may in particular comprise the delay detailed above. The processing time of the spraying unit $t_p$ is for instance of the order of one second.

In one embodiment, the railway vehicle may be a train travelling on the train track. In this embodiment, the speed v may be higher than 40 km/h, more preferably higher than 50 km/h, or even higher than 80 km/h. In this embodiment also, the spraying unit and the camera may be located quite far from one another on the railway vehicle, for instance between 10 and 40 m apart.

In another embodiment, the railway vehicle may be a road-rail vehicle travelling on the train track. In this embodiment, the speed v may be for instance between 10 and 30 km/h. In this embodiment also, the spraying unit and the camera may be located quite close from one another on the railway vehicle, for instance between 2 and 10 m apart.

The latency time $t_l$ may also be constrained by the camera 3 as it will now be described. The acquisition system of the camera 3 has a predefined field of view (FOV). More precisely, the lens focal length and image sensor size sets up a relationship between the field of view and the working distance (the distance between the back of the lens and the imaged railway track). The field of view is thus the area of the inspection captured on the camera's sensor. The size of the field of view and the size of the camera's sensor directly affect the image resolution (one determining factor in accuracy). The field of view is in particular limited by the resolution that is required to be able to identify the weed species as detailed above The field of view may thus be expressed in square meters and may in particular be less than 10 square meters, for instance around 5 square meter.

The field of view extends along the longitudinal direction X and the transversal direction Y.

The longitudinal extension of the field of view $FOV_X$ may be comprised between 1 m and 3 m. The transversal extension of the field of view $FOV_Y$ may be comprised between 1 m and 5 m.

The latency time may also be constrained by the longitudinal extension of the field of view $FOV_X$ and the frame rate of the camera.

For instance, if the camera has a longitudinal extension of the field of view $FOV_X$ of about 1 meter, the camera has to output a new image every time the railway vehicle has travelled 1 meter on the railway. In order to prevent the accumulation of image in a buffer, the latency time of the weed species identification unit then has to be less than the time between two consecutive acquisitions of the camera 3.

In particular, a relation can be set between the longitudinal extension of the field of view ($FOV_X$) and the latency time ($t_l$) as follows:

$$FOV_X/t_l > v$$

or equivalently:

$$t_l < FOV_X/v$$

As a matter of example, if the longitudinal extension of the field of view ($FOV_X$) is about 1 meter and the speed (v) about 60 km/h, i.e. 14 m/s, the latency time ($t_l$) has to be less than 60 ms.

The parameters of the processing operations described before, in particular the parameters of the kernels of the convolution operations can be determined by operating a calibration process that will now be described in greater details.

A plurality of weed species is listed in a database of weed species. The database of weed species may comprise for instance Poa annua, Achillea millefolium, Cirsium arvense, Erigeron Canadensis, Geranium mole, Plantago lanceolata, Senecio inaequidens, Sonchus arvensis, Taraxacum officinale, Trifolium repens, Oenotera biennis or Equisetum arvensis.

A railway vehicle such as the railway vehicle 1 is provided with at least one camera 3 able to acquire an image of a portion of a railway track, during a movement of said railway vehicle on a railway.

The camera 3 used during the calibration process can be similar to the camera described above.

The railway vehicle 1 may also be similar with the exception that is may be provided only with a camera and thus without a spraying unit 4 or a weed species identification unit 5.

The camera 3 acquires images comprising matrices of pixel values as detailed above.

The railway vehicle 1 travels a train track presenting at least a predefined number of each weed species of a database of target weed species. The predefined number is advantageously a large number, for instance larger than a few hundred or a thousand of samples of each target weed species.

The railway vehicle 1 thus acquires at least a predefined number of images of each weed species of said database of target weed species. For instance, more than a few hundred or a few thousands of images containing a sample of each target weed species. This step of acquiring at least a predefined number of images of weed species is the first step of the process illustrated in FIG. 5.

Figure 5:
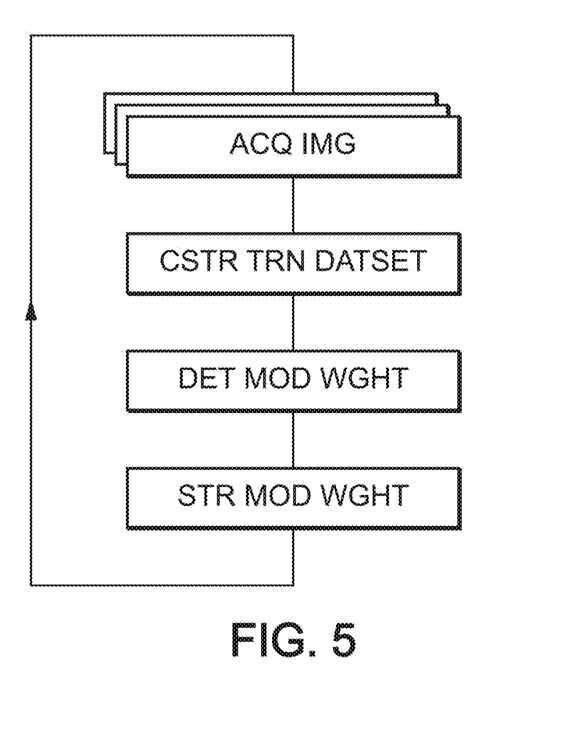
FIG. 5 is a flowchart detailing a step of a method for calibrating the weeding system of FIGS. 1 and 2, according to embodiments of the invention.

In a second step, a training dataset can be constructed from the predefined number of images of each weed species by tagging the weed species on the images. The tagging operation can comprise assigning a category of weed for each sample acquired in the image and can also comprise defining a bounding box or an indication of the location, inside an image, of each weed species shown in said image.

For each category of weed, we thus have several samples illustrating said category of weed. It is then possible to determine common features between said samples like the shape, the texture, the color and/or the location of the category of weed. A learning step described below is based on the training dataset and on the tagged weed species to which a category has been assigned.

In other words, from the images on which the different weed species have been indicated, it is possible to determine the distinguishing features which will enable the different weed species to be distinguished between them. It is therefore not even necessary to indicate on which criteria to differentiate weed species, since these criteria can be automatically determined analysis of images and the determination of common features between several samples tagged as indicating the same weed species.

In a third step, a set of weed identification model weights is then determined from the training dataset. The set of weed identification model weights comprises at least one predefined kernel for a convolution operation as detailed above.

Indeed, the coefficients of the kernel have to be calibrated so that the kernel is general and can be applied to a wide variety of weed species. The coefficients of the kernel are determined on the basis of the training dataset. Once again, the coefficients of the kernel are determined on the basis of the features of the different weed species learned on the basis of the training dataset like the shape, the texture, the color and/or the location of the weed species in the images.

The images acquired by the railway vehicle 1, also called training dataset, thus allow learning the features of the weed species to determine a set of weed identification model weights as well as coefficients of the kernel. This learning step is performed in order to maximize the accuracy of the model. The goal of this step is for instance to maximize the probability of predicting the weed samples tagged in the train in dataset. The set of model weights may be determined by using machine learning technics, for instance by using gradient descent algorithms. The operations previously described are performed on the images of the training dataset. The coefficients of the kernel initially used for performing the operations can be determined in different ways. For instance, the coefficients of the kernel can be randomly predefined. It is then possible to determine an error rate on the images on which the operations have been performed. Indeed, since the different weed species have been tagged on the images, it is possible to compare, for each weed species tagged if the detection obtained by performing the operations is correct. If the error rate is not acceptable, for instance whether the error rate is higher than a predetermined threshold, a back-propagation learning can be performed to modify the set of weed identification model weights, hence the coefficients of the kernel. Obviously, after the first pass, significant modifications are necessary on the weed identification model weights, especially if these parameters have been randomly predefined. This step can obviously be repeated as much as necessary.

To summarize the above, the training dataset is used for a learning step during which the weights of the operations and the coefficients of the kernel are determined. Features like the shape, the texture, the color and/or the location of each weed species are automatically determined on the basis of the images of the training dataset in which a tagging operation has been performed to assign a category of weed for each sample. After performing the operations on the images of the training dataset, the accuracy of the model is estimated, with an error rate for instance, and a back-propagation learning is carried out to modify the weed identification model weights. This step of performing the operations and the back-propagation learning can be repeated so that the error rate obtained is reduced. Finally, in a fourth step, the set of weed identification model weights is stored in the memory module 14 of the weeding system 2 and can then be used for a weeding operation as detailed above.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the presence invention. One skilled in the art will readily recognize from such discussion and from the accompanying drawings and claims that various changes, modifications and variations can be made therein without departing from the spirit and scope of the invention as defined in the following claims.

The invention claimed is:

1. A weeding system for a railway weeding vehicle, comprising:
    at least one camera adapted to be mounted on a railway vehicle to acquire an image of a portion of a railway track while said railway vehicle is travelling on a train track, said image comprising a matrix of pixel values,
    a spraying unit adapted to be mounted on said railway vehicle and comprising
    at least two supply modules, each supply module comprising a chemical agent tank and an electronic delivery valve,
    at least one nozzle to spray a chemical agent from at least one of said supply modules, and
    a controller module able to receive a weed species detection signal and to selectively command the spraying of chemical agent from at least one of said supply modules though said at least one nozzle on the basis of said weed species detection signal,
    the weeding system being characterized in that it further comprises:
    a weed species identification unit comprising
    a communication module able to receive the image acquired by the camera and to send a weed species detection signal to a controller module of a spraying unit of the weeding system,
    a memory module able to store said image, and
    a processing module comprising a plurality of parallel processing cores,
    each parallel processing core being able to perform at least one convolution operation between a sub-matrix constructed from nearby pixels of the image and a predefined kernel stored in the memory module to obtain a feature representation sub-matrix of the pixel values of the image, the processing module being able to compute at least one probability of presence of a weed species among a database of weed species from a feature representation matrix of the image constructed from the feature representation sub-matrices constructed by the parallel processing cores, and to generate a weed species detection signal on the basis of said at least one probability of presence.

2. The weeding system of claim 1, wherein the spraying unit and the camera are separated from one another on the railway vehicle by a separation distance ds along a longitudinal axis of the railway vehicle,
    wherein the weed species identification unit is able to generate a weed species detection signal from an image acquired by the camera with a latency time tl,
    wherein said separation distance ds and said latency time tl are such that $ds/(tl+tp) > v$, where v is a speed of the railway weeding vehicle travelling on a train track and tp is a processing time of the spraying unit,
    wherein, said speed v is higher than 10 km/h and said separation distance ds is less than 10 m.

3. The weeding system of claim 2, wherein the camera has a longitudinal extension of the field of view FOVX along a longitudinal axis of the railway vehicle,
    wherein the weed species identification unit is able to generate a weed species detection signal from an image acquired by the camera with a latency time tl,
    wherein said longitudinal extension of the field of view FOVX and said latency time tl are such that $FOVX/tl > v$, where v is a speed of the railway weeding vehicle travelling on a train track,
    wherein said speed v is higher than 40 km/h and said longitudinal extension of the field of view FOVX is less than 5 m.

4. The weeding system of claim 1, wherein the camera is mounted on the railway vehicle in order to acquire an image comprising a matrix of at least one million pixel values wherein each pixel of said at least one million pixel values independently covers an elementary area of the ground area of less than five square millimetres.

5. The weeding system of claim 1, wherein each parallel processing core performs said at least one convolution operation by computing a matrix to matrix multiplication between the sub-matrix and a predefined kernel matrix, or by computing a Fast Fourier Transform of the sub-matrix.

6. The weeding system of claim 1, wherein the parallel processing cores of the processing module are able to perform a pooling operation of the feature representation matrix of the image comprising determining a statistic of a sub-matrix of nearby values of said feature representation matrix, in particular a maximum of said sub-matrix of nearby values.

7. The weeding system of claim 1, wherein the parallel processing cores of the processing module are able to perform a non-linear parallel processing of the feature representation matrix of the image by applying a non-linear operation to each value of said feature representation matrix, such as a rectified linear activation function.

8. The weeding system of claim 1, wherein the processing module performs a sequence of n processing operations starting from an input matrix generated from the pixel values of the image and ending with an output matrix comprising at least one probability of presence of a weed species among a database of weed species, in particular wherein each processing operation i of said sequence of successive processing operations takes as input a feature representation matrix $F_{i-1}$ outputted by a preceding processing operation i-1 or an input matrix generated from the pixel values of the image, and generates a feature representation matrix $F_i$.

9. The weeding system of claim 1, wherein the weed species detection signal comprises a weed species location indicator,
    in particular wherein the output matrix comprises at least one value indicative of a location of a weed species among the database of weed species inside the image acquired by the camera.

10. The weeding system of claim 9, wherein the spraying unit comprise a plurality of nozzles arranged along a transversal direction of the railway vehicle, and
    wherein the controller module of the spraying unit receives the weed species detection signal and further commands the spraying of chemical agent through the plurality of nozzles based on the weed species location indicator.

11. The weeding system of claim 9, wherein the spraying unit comprises at least one movable nozzle able to selectively spray a plurality of target zones along a transversal direction of the railway vehicle, and
wherein the controller module of the spraying unit receives the weed species detection signal and further commands a position and/or orientation of the movable nozzle based on the weed species location indicator.

12. A railway weeding vehicle comprising the weeding system of claim 1 mounted on said vehicle.

13. A method for weeding a train track using the railway weeding vehicle of claim 12, comprising
acquiring an image of a portion of a railway track while said railway vehicle is travelling on a train track process for a railway weeding vehicle, using at least one camera mounted on the railway vehicle, said image comprising a matrix of pixel values,
receiving the image acquired by the camera in a communication module of a weed species identification unit of the railway vehicle and storing said image in a memory module of said weed species identification unit,
performing in parallel, in a plurality of respective parallel processing cores of a processing module, a plurality of respective convolution operations, each convolution operation being performed between a sub-matrix constructed from nearby pixels of the image and a predefined kernel stored in the memory module to obtain a feature representation sub-matrix of the pixel values of the image,
computing at least one probability of presence of a weed species among a database of weed species from a feature representation matrix of the image constructed from the feature representation sub-matrices constructed by the parallel processing cores,
generating a weed species detection signal on the basis of said at least one probability of presence a weed species and sending said weed species detection signal to a controller module of a spraying unit of the weeding system,
receiving the weed species detection signal in a controller module of a spraying unit mounted on the railway vehicle, and
selectively commanding the spraying of chemical agent from at least one supply modules of the spraying unit though at least one nozzle on the basis of the weed species detection signal.

14. A method for calibrating the weeding system of claim 1, adapted to spray a plurality of weed species listed in a database of weed species, wherein
a railway vehicle is provided with at least one camera able to acquire an image of a portion of a railway track, during a movement of said railway vehicle on a railway, said image comprising a matrix of pixel values,
said railway vehicle travels a train track presenting at least a predefined number of each weed species of a database of target weed species, and acquires at least a predefined number of images of each weed species of said database of target weed species,
a training dataset is constructed from said predefined number of images of each weed species by tagging said weed species on said images,
a set of weed identification model weights is determined from the training dataset, said set comprising at least one predefined kernel for a convolution operation performed by a parallel processing core of a weeding system according to claim 1,
the set of weed identification model weights is stored in a memory module of a weeding system according to claim 1.

15. A non-transitory computer-readable medium comprising an executable program stored thereon and including instructions for the implementation of the method of claim 13 when said instructions are executed by a processor.

\* \* \* \* \*